April 7, 1964     J. J. FISCHER ETAL     3,127,774
MEANS AND METHOD FOR DETERMINING THE DIRECTION OF THE
AXIS OF ROTATION OF A CONTROLLABLY ROTATING PLATFORM
Filed Nov. 8, 1961                                           8 Sheets-Sheet 1

*INVENTORS*
JOHN J. FISCHER
FRANK M. PELTESON
BY

*Ernest L Brown*
ATTORNEY

INVENTORS
JOHN J. FISCHER
FRANK M. PELTESON
BY
Ernest L. Brown
ATTORNEY

INVENTORS
JOHN J. FISCHER
FRANK M. PELTESON
BY
*Ernest L. Brown*
ATTORNEY

United States Patent Office 3,127,774
Patented Apr. 7, 1964

3,127,774
MEANS AND METHOD FOR DETERMINING THE DIRECTION OF THE AXIS OF ROTATION OF A CONTROLLABLY ROTATING PLATFORM
John J. Fischer, Fullerton, and Frank M. Pelteson, Long Beach, Calif., assignors to North American Aviation, Inc.
Filed Nov. 8, 1961, Ser. No. 151,011
14 Claims. (Cl. 73—504)

This invention pertains to a means and method for determining the angular velocity and the direction of the axis of rotation of a platform or frame which is caused to rotate in response to the drift of inertial reference devices such as gyroscopes, or the like. More particularly, this invention pertains to a means and method for determining the components of the angular velocity of said platform relative to a cartesian coordinate system which is fixed on the platform.

A platform or frame, useable for inertial navigation, which is controlled in response to the drift of inertial reference devices (for example, gyroscopes or vibrating strings) rotates, except for random, small errors, at a fixed angular velocity relative to the stars and relative to a set of coordinates which is fixed to the platform. The angular velocity of the platform is fixed as long as the drift of the inertial reference devices about their output axes is not varied.

In the device which is to be calibrated by the means and method of this invention, the inertial reference devices receive no controlled torques which affect their drift about the axes which control the platform rotation. Hence, their drift is considered fixed.

Accelerometers are affixed to the platform with their sensitive axes in the directions of three cartesian coordinate axes which are fixed in the platform. It is within the contemplation of this invention that single axis, two axes or three axes accelerometers could be used. The means and method of this invention are described assuming that three separate single axis accelerometers are positioned upon the rotating platform with the sensitive axis of each accelerometer directed along a different axis of the cartesian coordinate system defined on the platform.

By using the information generated by the accelerometers, it is possible to determine the components of the drift angular velocity of the platform in the coordinate system which is fixed in the platform. Once the angular velocity magnitude and direction is known relative to the coordinate system in the platform body, the signals generated by the accelerometers can be related through a continually computed coordinate transformation, based on the said angular velocity information, to acceleration components in a different set of coordinates, for example a set of earth-fixed geographic coordinates.

It is an object of this invention to determine the components in platform-fixed coordinates of the angular velocity of drift or drift rate of a rotating platform.

It is a further object of this invention to provide means for determining the components of the angular velocity of a platform in platform-fixed coordinates.

It is a more particular object of this invention to determine the components of the angular velocity of a platform in coordinates which are fixed in the platform.

Other objects will become apparent from the following description taken in connection with the accompanying drawings in which.

Figure 1:
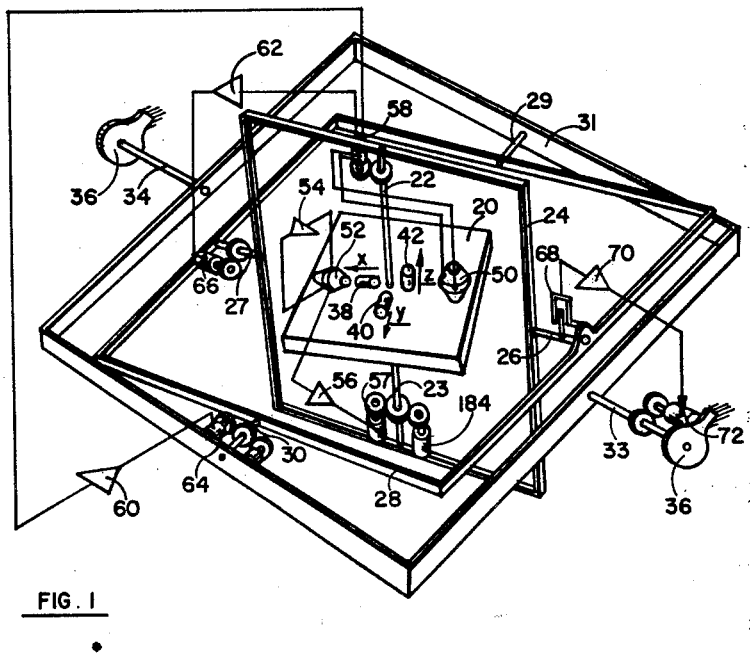
FIG. 1 is a first embodiment of a rotatable platform which is calibrated by this invention.

In FIGS. 1, 2, 5, 6, and 7 a rotatable, gimbaled platform 20 is supported for rotation about a first axis, denoted the Z axis, upon coaxial shafts 22 and 23. Shafts 22 and 23 are mounted for rotation relative to gimbal 24 upon bearings (not shown). Gimbal 24 is mounted for rotation, relative to gimbal 28, upon coaxial shafts 26 and 27 whose common axis is perpendicular to the axis of shafts 22 and 23. Gimbal 28 is mounted for rotation, relative to gimbal 31, upon coaxial shafts 29 and 30, whose common axis is perpendicular to the axis of shafts 26 and 27. Gimbal 31 is mounted for rotation, relative to a supporting vehicle 36, upon coaxial shafts 33 and 34 whose common axis is perpendicular to the axis of shafts 29 and 30.

Three accelerometers 38, 40, and 42 are affixed to platform 20 with their sensitive axes forming an orthogonal set of coordinates. The set of coordinates defined by the sensitive axes of accelerometers 38, 40, and 42 are called the platform coordinates and are designated herein as X, Y, and Z, respectively. Alternatively, two two-axes accelerometers could replace all three accelerometers.

Figure 3:
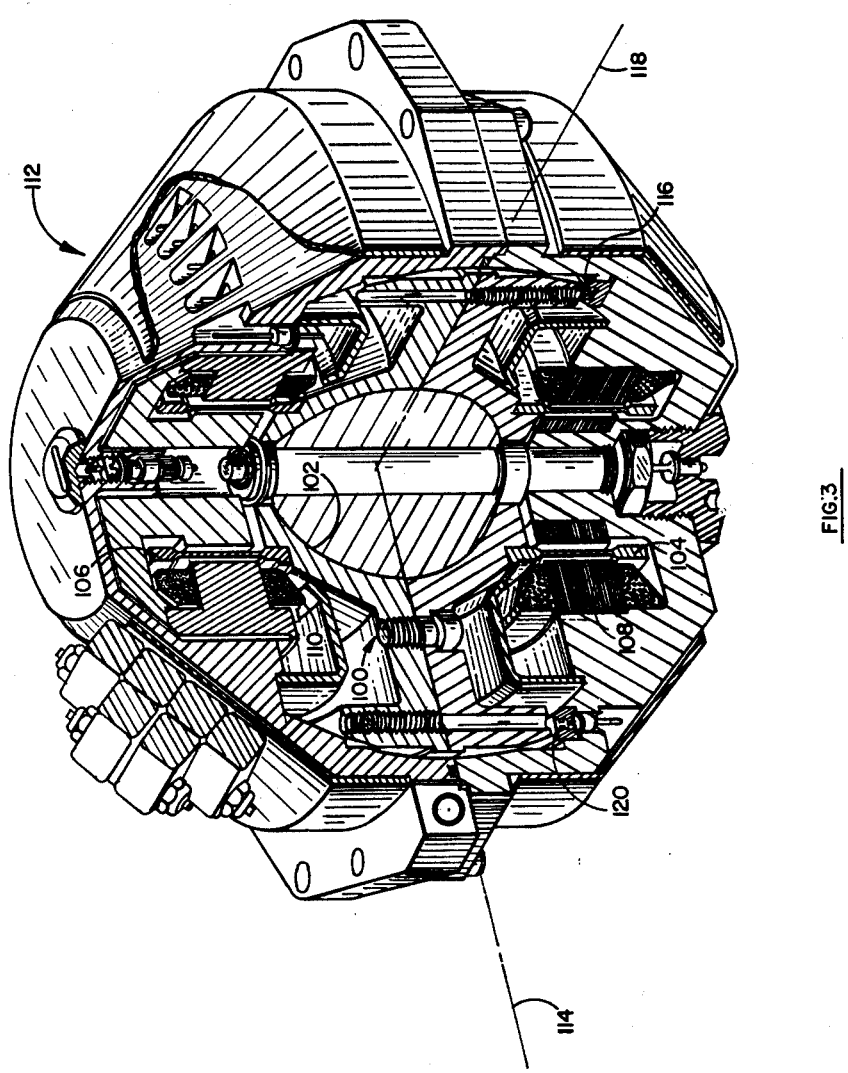
FIG. 3 is a view, partly in section, of a typical two degree of freedom gyroscope whose drift may be used to control the spatial orientation of the platform which is calibrated.

In FIG. 1, platform 20 and its supporting gimbal system are controlled by a pair of free-rotor gyroscopes 50 and 52 (see FIG. 3). Free-rotor gyroscope 50 has its spin axis oriented in the direction of the Z axis of platform 20 to cause gyroscope 50 to be sensitive to angular displacement about the X and Y axes between the rotor of gyroscope 50 and platform 20.

Free-rotor gyroscope 52 has its spin axis in the plane of the X and Y axes. The orientation of the spin axis of gyroscope 52 in the plane of the X and Y axes is not critical. Gyroscope 52 senses angular displacement about the Z axis between the rotor of gyroscope 52 and platform 20.

The rotor of gyroscope 52 is caged about its sensitive or output axis which is in the horizontal plane. The caging of gyroscope 52 is accomplished by sensing the angular displacement relative to platform 20 of the rotor of gyroscope 52 about its horizontal sensitive axis, amplifying the sensed signal by means of amplifier 54, and torquing gyroscope 52 to return the sensed signal to zero.

Gyroscope 52 could be replaced by a single degree of freedom gyroscope which is sensitive only to angular displacement about the Z axis.

The signal at the Z axis output of gyroscope 52 is connected through amplifier 56 to motor 57 which is mechanically connected between shaft 23 and gimbal 24 to drive platform 20 in a direction to reduce the signal to zero at the Z axis output of the gyroscope 52.

The X axis output signal and the Y axis output signal of gyroscope 50 are connected through resolver 58 and amplifiers 60 and 62 to motors 64 and 66, respectively. Motor 64 is mechanically connected to drive gimbal 28 relative to gimbal 31 and motor 66 is mechanically connected to drive gimbal 24 relative to gimbal 28 in directions to return to zero the signals at the X axis and the Y axis outputs of gyroscope 50.

An angle sensing means 68 is mechanically positioned to detect angular deviation from a right angle between gimbals 24 and 28. A signal generated by pickoff means 68 is connected through amplifier 70 to a motor 72. Motor 72 is mechanically positioned to drive gimbal 31 relative to the supporting means 36 in a direction to return to zero the signal at pickoff means 68. When the signal at pickoff means 68 is zero, the planes of gimbals 24 and 28 are perpendicular.

Figure 2:
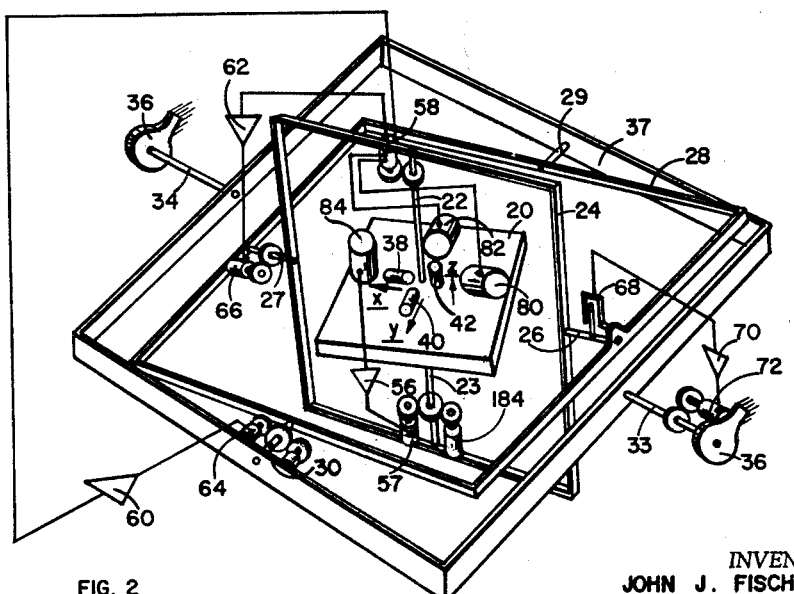
FIG. 2 is a second embodiment of a rotatable platform which is calibrated by this invention.

In FIG. 2, three single axis inertial angular error sensors 80, 82, and 84 such as single degree of freedom gyroscopes or vibrating strings are positioned upon platform 20 to sense platform angular rotation error about the X, Y, and Z axes, respectively. The Z axis output of inertial angular reference means 84 is connected through amplifier 56 to motor 57 to drive platform 20 relative to gimbal 24 in a direction to return to zero the Z axis output signal of angular reference means 84. The X and Y axes outputs of inertial angular reference means 80 and 82 are connected through resolver 58 and amplifiers 60 and 62 to motors 64 and 66 to drive gimbals 28 and 24 in directions to return to zero the output signals of inertial reference means 80 and 82. Pickoff means 68 is connected through amplifier 70 to motor 72 to drive gimbal 31 relative to the supporting means 36 in a direction to return to zero the output signal of pickoff means 68.

A typical free-rotor gyroscope such as that shown and described in patent application Serial No. 641,720 entitled "Free Rotor Gyroscope," filed February 21, 1957, by D. B. Duncan et al., and a torquing means such as that shown and described in patent application Serial No. 802,566 entitled "Free Rotor Gyroscope Motor and Torquer Drives," filed March 27, 1959, by John M. Slater et al., now Patent No. 3,073,170, both assigned to North American Aviation, Inc., the assignee of the present invention, are shown in FIG. 3.

In FIG. 3, rotor 100 is supported relative to case 112 on a gas lubricated ball-type bearing at 102. Attached to opposite ends of rotor 100, in the shown embodiment of FIG. 3, by any convenient means, e.g., a shrink fit, are respective cylindrical motor sleeve 104 and cylindrical torquer sleeve 106. Although gyroscope 52 would require a torquer—for example the torquer 106—gyroscope 50 would not need a torquer 106. In gyroscope 50 sleeve 106 could be used as an additional motor sleeve and the remaining structure surrounding sleeve 106 could be identical with that surrounding sleeve 104. Motor sleeve 104 may, for example, be fabricated of copper. Sleeve 106, when used as a torquer sleeve, may be made of such material as Manganin and Constantan, alloys of copper, manganese, and nickel which change very little in resistance with temperature. If sleeve 106 is a motor sleeve, it will also be preferably made of copper.

A stator motor winding 108 is used to drive rotor 100. Magnetic windings such as winding 110 may be utilized to apply torque through sleeve 106 to rotor 100.

Deflection of rotor 100 relative to case 112 about axis 114 is detected by a pair of symmetrically positioned capacity pickoffs, one of which is shown at 116. The capacity pickoffs are connected into an appropriate bridge circuit (not shown) whose output signal is a measure of the deflection about axis 114 of rotor 100 relative to case 112.

The deflection of rotor 100 relative to case 112 about axis 118 is detected by a pair of symmetrically positioned capacity pickoffs, one of which is shown at 120. The capacity pickoffs are connected into a bridge circuit (not shown) to generate an output signal which is a measure of the deflection about axis 118 of rotor 100 relative to case 112.

Devices 80, 82, and 84 in FIG. 2 may, for example, be of the type shown in copending patent application Serial No. 75,442, for "Gyroscope Apparatus," filed by William D. Mullins, Jr., and William M. Scarborough on December 12, 1960, and in patent application Serial No. 96,611, entitled "Stable Reference Apparatus," filed by William D. Mullins, Jr., and William H. Quick on March 17, 1961, assigned to North American Aviation, Inc., the assignee of this application.

Figure 4:
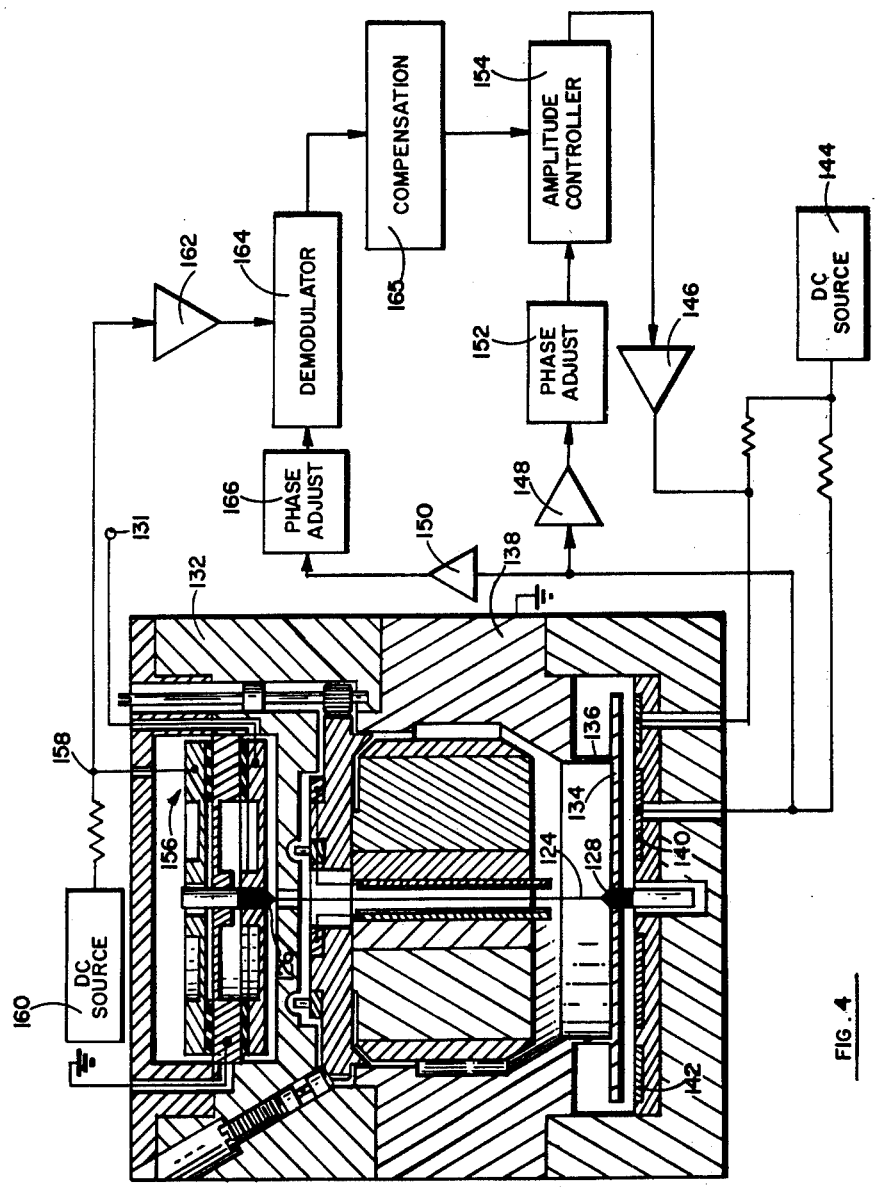
FIG. 4 is a view, partly in section, of a typical vibrating string reference device whose drift may be used to control the spatial orientation of the platform which is calibrated.

A typical vibrating string in an inertial reference element of the kind shown and described in patent application Serial No. 75,442 and patent application Serial No. 96,611 is shown in FIG. 4. Vibrating string 124 comprises a quartz fiber having enlarged integral end portions 126 and 128 and a metallic coating, such as gold or chromium, to cause the string to be conductive. A driving disc 134 is secured to housing 132 along an annular area at a vibration node of the disc by means of an annular support sleeve 136, which is integral with disc 134 and with support member 138 which forms a fixed part of the housing 132. Enlarged portion 128 of string 124 is secured by cement to a closely fitting aperture located at the center of the drive disc 134.

Disc 134, fabricated—for example of metal or quartz— is driven, preferably at its resonant frequency, by an electrostatic drive. If made of quartz, disc 134 has a conductive coating on its under surface to form a capacitance with electrodes 140 and 142.

Electrode 142 is connected to a direct current bias source 144 and to the output of driving amplifier 146. The deflection of diaphragm 134 is detected by capacity pickoff electrode 140. The voltage variation on electrode 140, caused by oscillation of diaphragm 134, is connected to the inputs to amplifiers 148 and 150. The signal at the output of amplifier 148 is connected through a phase adjustor 152 and an amplitude controller 154 (for example a variable gain amplifier) to the input of driving amplifier 146. The phase adjustor 156 is adjusted to obtain maximum oscillation of disc 134. Amplitude controller 154 is used to control the amplitude of the driving force on disc 134 to stabilze the drift of the plane of oscillation of string 124.

It is desirable to maintain the tension in string 124 at a predetermined value to stabilize to a substantially constant value the angular drift of the plane of oscillation of string 124. A capacitive means 156 senses the tension in string 124 and generates a signal at terminal 158, which is a measure of said tension. Direct current source 160 is connected to bias electrically the tension measuring mechanism 156. The signal from terminal 158 is connected through amplifier 162 to control a demodulator 164. Demodulator 164 receives a signal from pickoff electrode 140 through amplifier 150 and phase adjustor 166. The phase adjustor 166 is adjusted to cause the voltage at the output of demodulator 164 to be of the proper sense to be connected through a compensation network 165 to control the amplitude of the signal at the output of amplitude controller 154 thereby to limit the magnitude of the signal driving disc 134. The output of demodulator 164 is positive if the voltage at the output of amplifier 162 is in phase with the output of phase adjustor 166 and negative if the voltage at the output of amplifier 162 is opposite in phase from the output of phase adjustor 166. To introduce compensation into the servo loop, a compensation network 165 is connected between demodulator 164 and amplitude controller 154.

Figure 5:
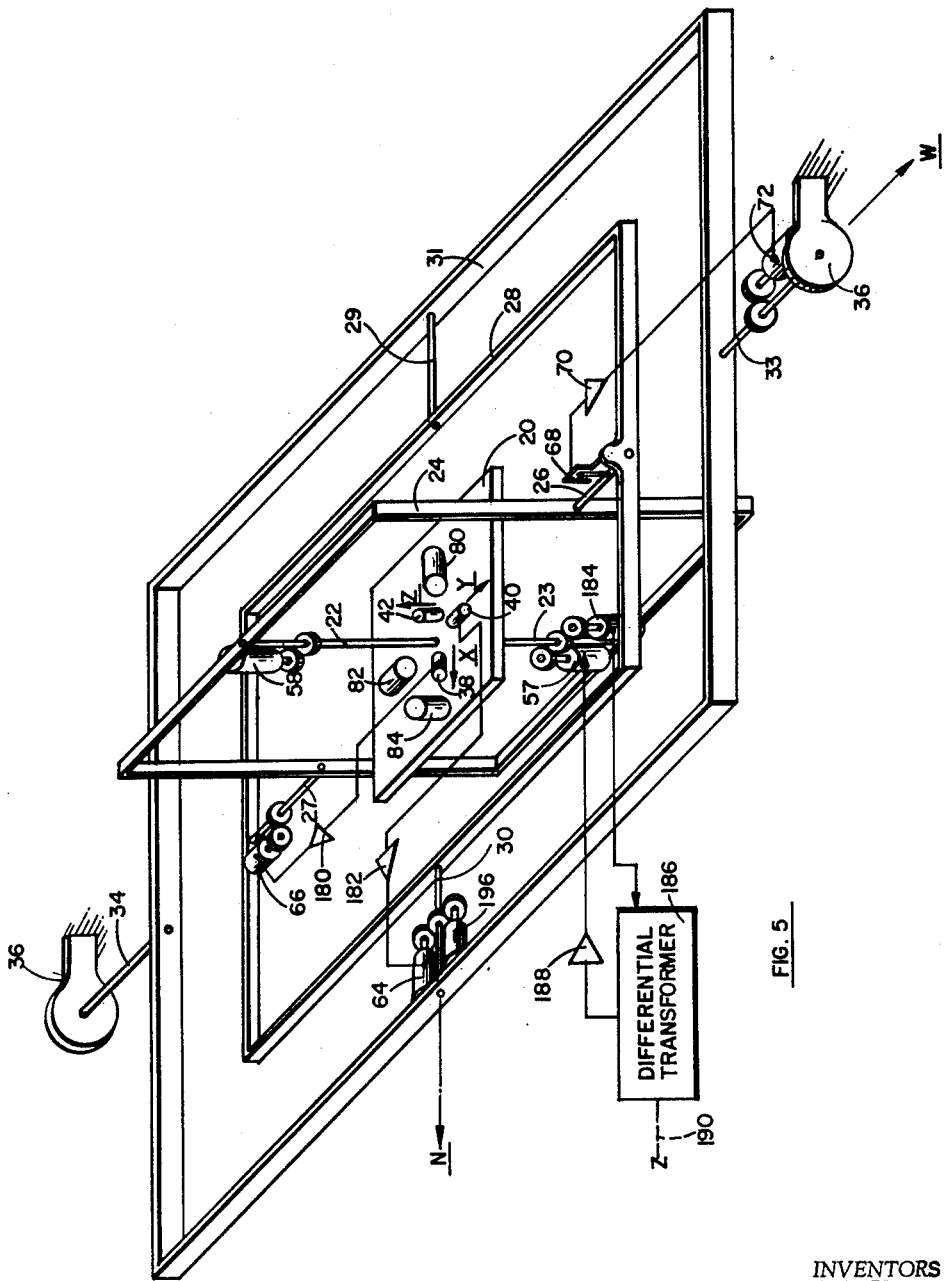
FIG. 5 is a view of the platform of FIG. 2, oriented relative to a north-east-south-west earth coordinate system for a first step in the calibration of the drift rate of the platform.
Figure 6:
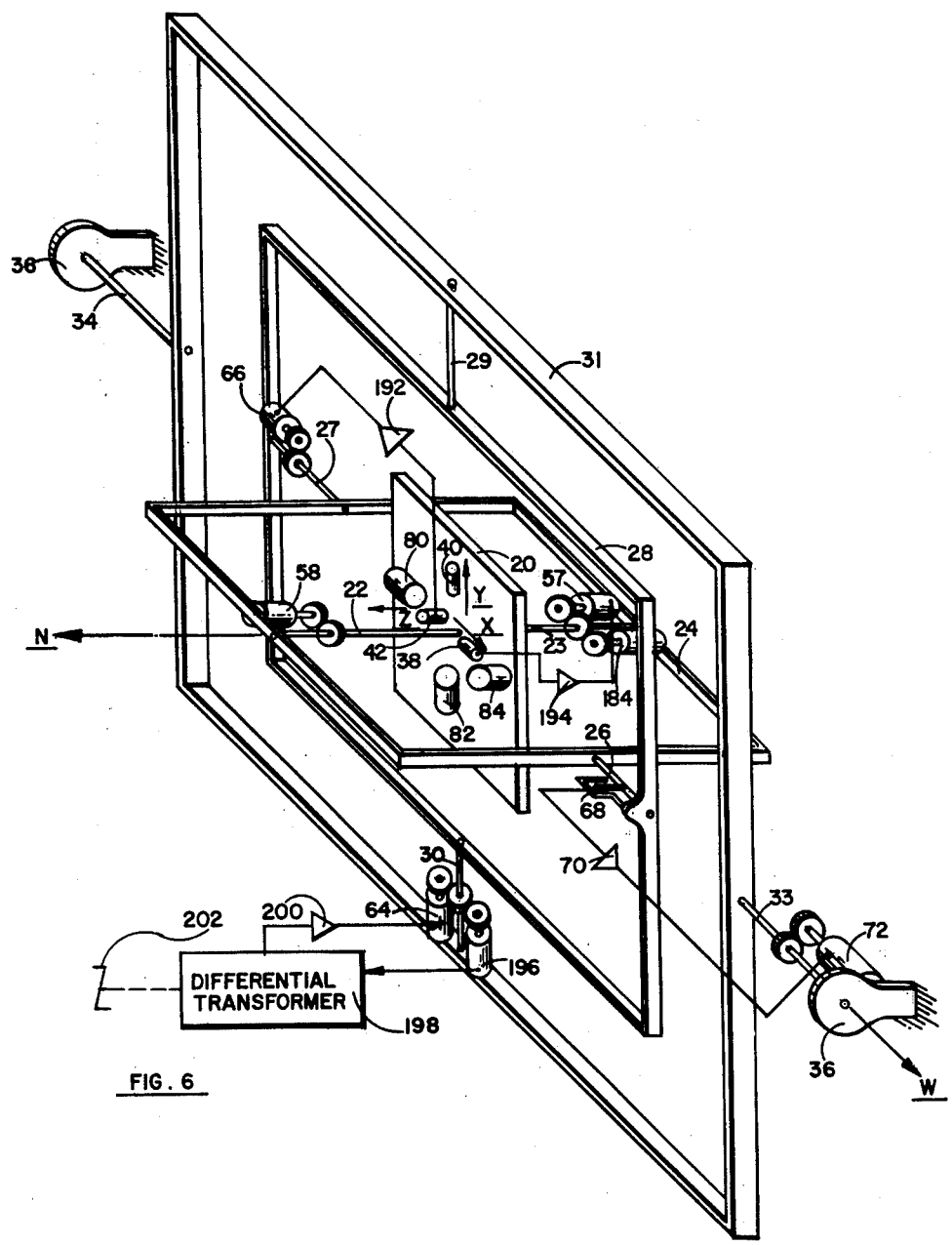
FIG. 6 is a view of the platform of FIG. 2, oriented relative to a north-east-south-west earth coordinate system for a second step in the calibration of the drift rate of the platform.
Figure 7:
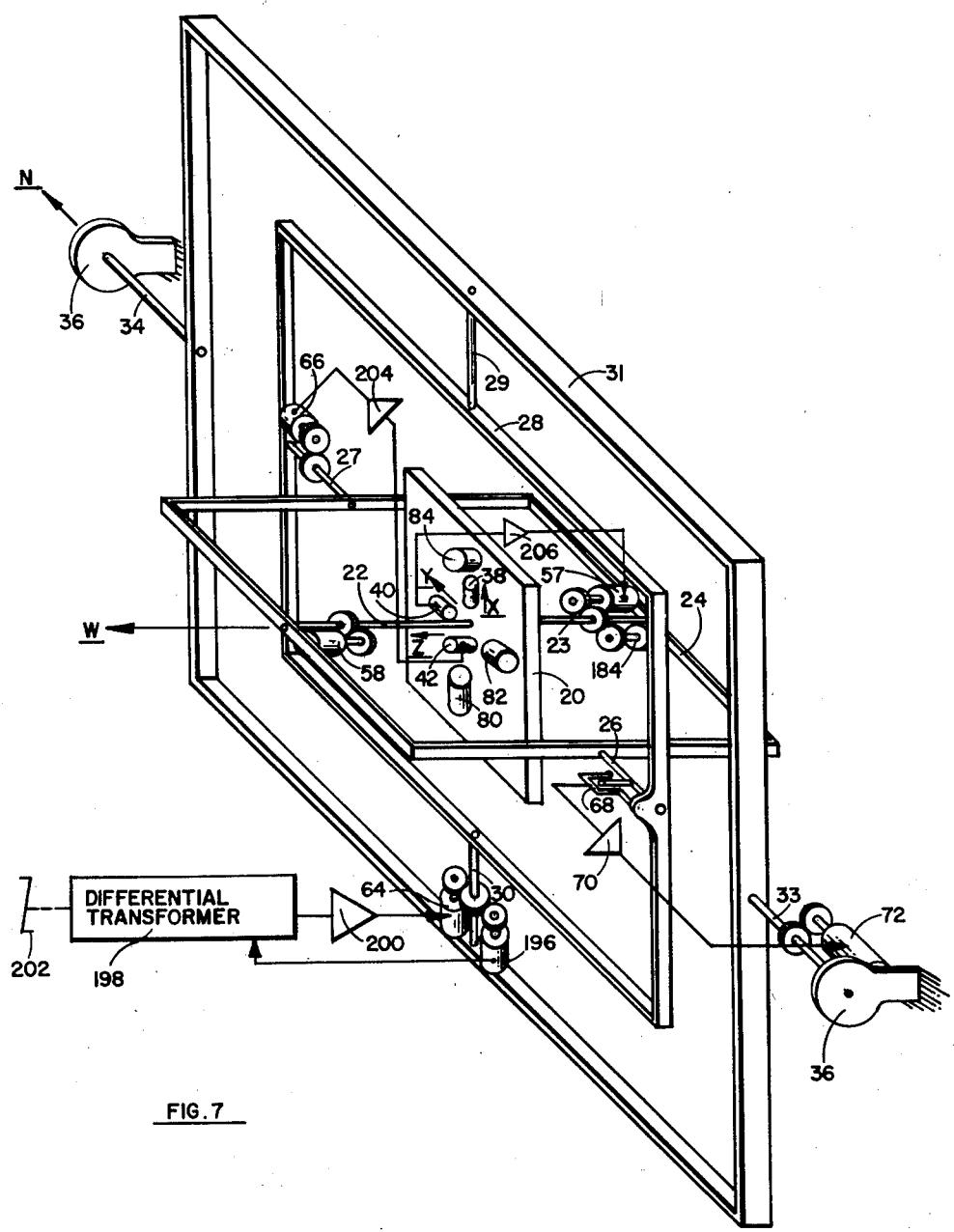
FIG. 7 is a view of the platform of FIG. 2, oriented relative to a north-east-south-west earth coordinate system for a third step in the calibration of the drift rate of the platform.

FIGS. 5, 6, and 7 show the platform 20 positioned in three starting positions in one preferred sequence of orientations preparatory to calibrating the angular velocity of drift of platform 20 by the method of this invention. In each of FIGS. 6, 5, and 7 the gimbal position is shown connected to be controlled by two of the three accelerometers 38, 40, and 42 to cause the sensitive axes of the two controlling accelerometers to be positioned in a locally horizontal plane, at which event the controlling accelerometer outputs go to zero.

In FIG. 5, the output of accelerometer 38 is connected through amplifier 180 to control motor 66 to cause the signal to return to zero at the output of accelerometer 38. Accelerometer 40 is connected through amplifier 182 to motor 64 to control the position of gimbal 28 to return to zero the signal at the output of accelerometer 40. A pickoff 184, such as a synchro, is connected to detect the angle of the shaft 23 relative to gimbal 24. The output of synchro 184 is connected through a differential transformer 186 and an amplifier 188 to control the position of motor 57 and shaft 23 in response to the command input 190 of synchro differential transformer 186. Synchro differential transformer shaft input 190 is adjusted to cause the sensing, or X axis of accelerometer 38, to point substantially north and the sensing or Y axis of accelerometer 40 to point substantially west.

In FIG. 6, the output of accelerometer 42 is connected through amplifier 192 to motor 66 to control the position of gimbal 24 to cause the signal to return to zero at the output of accelerometer 42. The output of accelerometer 38 is connected through amplifier 194 to motor 57 to position platform 20 to return to zero the output signal from accelerometer 38. A pickoff device 196, such as a synchro, is connected by its output through synchro differential transformerd 198 and amplifier 200 to motor 64. Synchro 196 generates a signal which is a measure of the position of shaft 30 relative to gimbal 31. The shaft command input 202 of differential transformer 198 is set to cause the sensitive or X axis of accelerometer 38 to point substantially west and the sensitive or Z axis of accelerometer 42 to point substantially north.

In FIG. 7, the output of accelerometer 42 is connected through amplifier 204 to motor 66 to cause the signal to return to zero at the output of accelerometer 42. The output of accelerometer 40 is connected through amplifier 206 to motor 57 to cause the signal to return to zero at the output of accelerometer 40. The output of synchro 196 is connected through synchro differential transformer 198 and amplifier 200 to motor 64. The command input 202 to differential transformer 198 is set so that motor 64 causes the sensitive or Y axis of accelerometer 40 to point substantially north and the sensitive or Z axis of accelerometer 42 to point substantailly west.

Figure 8:
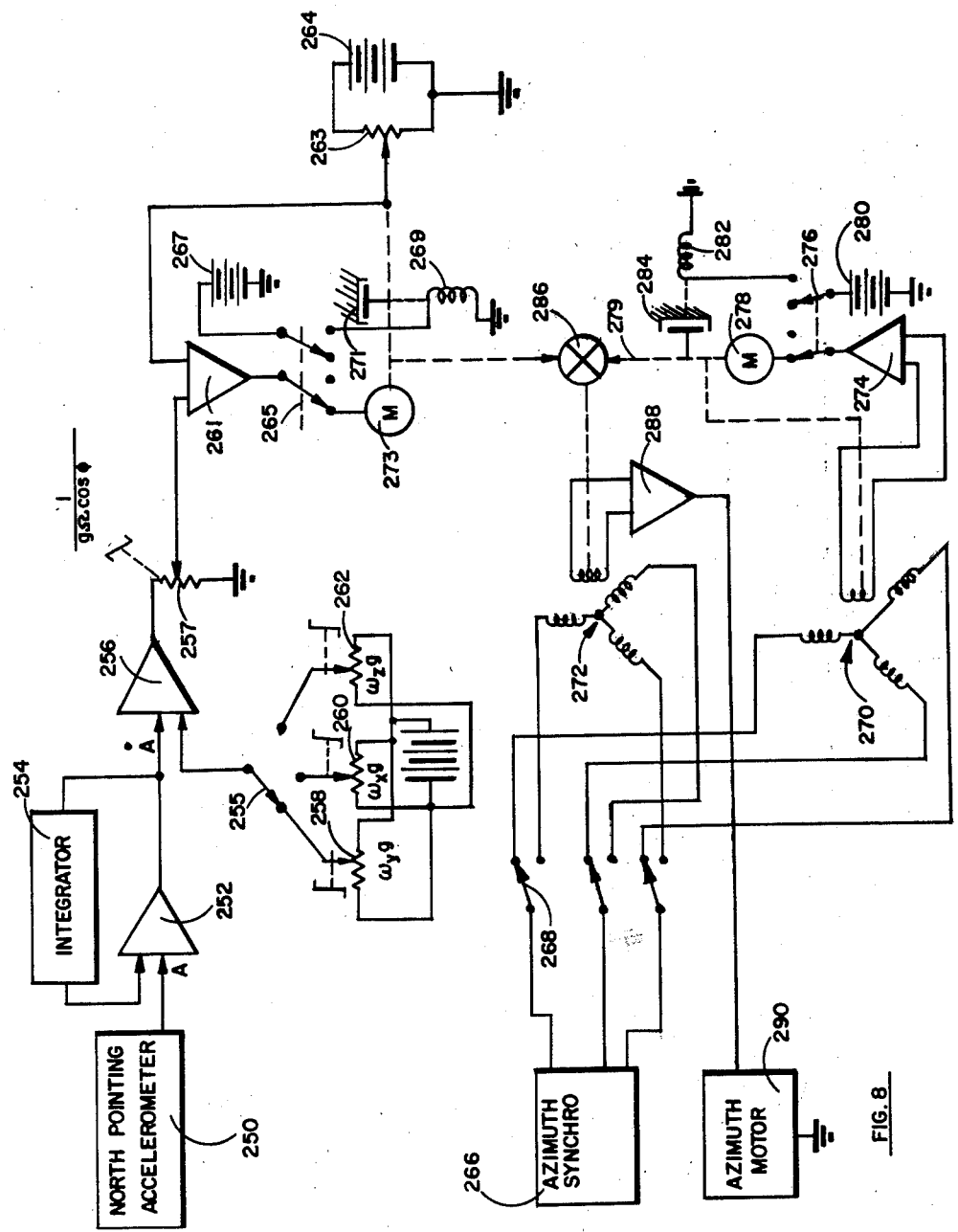
FIG. 8 is a schematic diagram of a first analog computation network used to calibrate the platform.

In FIG. 8 analog computer means is adapted to generate signals which are a measure of the error in the azimuth angle between the substantially north-pointing accelerometer sensing axis and the direction of the true north. The computer of FIG. 8 also generates signals which, when transmitted to the gimbal system which supports platform 20, servos or corrects the azimuth angle to cause the sensitive axis of the substantially north-pointing accelerometer to point more accurately toward true north.

A north-pointing accelerometer 250 which, may, in one sequence of operations of this invention, be consecutively accelerometer 38, accelerometer 42, and accelerometer 40 is connected to the input of a differentiating circuit comprising an amplifier 252 with a feedback integrator 254. The output of amplifier 252, which is a measure of the time derivative of the input of amplifier 252, is connected to the input of summing amplifier 256. A second input to amplifier 256 is obtained from the movable arm of a potentiometer 258, from the movable arm of potentiometer 260, or from the movable arm of potentiometer 262, depending on the position of switch 255. The position of the movable arm of potentiometers 258, 260, and 262 is a measure of the previously estimated or computed angular velocity of platform 20 about the Y, X, and Z axes, respectively, which ever is in a substantially east-west direction during the particular phase of the calibration. The position of the movable arms of potentiometers 258, 260, and 262 may be set in accordance with the output readings of the device of FIG. 9. The electrical output of amplifier 256 is connected across the fixed terminals of potentiometer 257. The movable arm of potentiometer 257 is mechanically positioned, in accordance with predetermined calculations, to cause the voltage on the movable arm to be equal to the voltage at the output of amplifier 256 divided by $g\Omega \cos \phi$ where "$g$" is the acceleration of gravity, $\Omega$ is the angular velocity of the earth, and $\phi$ is the local latitude angle. The electrical output on the movable arm of potentiometer 257 is a measure of the azimuth error angle, $\alpha_0$ in FIG. 10.

Potentiometer 257 is connected by its movable arm to the input of servo amplifier 261. Servo amplifier 261 is connected through switch 265 in the position shown to drive motor 273 to cause the shaft rotation of motor 273 to be proportional to the input of amplifier 261, and hence proportional to $\alpha_0$. A potentiometer 263 and voltage source 264 are used to convert the angle position of the shaft of motor 273 into an appropriate voltage to be fed back to the input of amplifier 261. Switch 265 is connected in the position shown to connect the output of amplifier 261 to the input of motor 273 and in the other position to connect voltage source 267 to energize a magnetic winding 269 which actuates a clutch 271 to hold the position of the shaft of motor 262.

Azimuth synchro 266 may be synchro 184 or synchro 196 depending upon the orientation of platform 20. When the platform is oriented as shown in FIG. 5, it is synchro 184. When the platform is oriented as shown in FIG. 6 or as shown in FIG. 7, it is synchro 196.

Azimuth synchro 266 in FIG. 8 is connected through switch 268 in the position shown to the stator winding of control transformer 270 or to 272 in the other position. The rotor of synchro 270 is electrically connected to the input of amplifier 274 whose output is connected through switch 276 in the position shown to drive motor 278. Motor 278 is connected by an output shaft to the rotor of control transformer 270 to drive the rotor of transformer 270 in a direction to cause the voltage to be reduced to zero at the input of amplifier 274.

The servo loop consisting of synchro control transformer 270, servo amplifier 274, and motor 278, repeats the angle, $\mu_0$, indicated electrically by azimuth synchro 266. $\mu_0$ is a measure of the angle between gimbals 28 and 31 in FIGS. 6 and 7, or between stable element 20 and gimbal 24 in FIG. 5. When the platform assumes the attitudes shown in FIGS. 5, 6, or 7 in which the controlling accelerometer outputs are zero, and in which the outermost axes 33 and 34 of the supporting means are reasonably level, angle $\mu_0$ represents the azimuth angle of the stable element 20 relative to the supporting means.

When switches 265 and 276 are switched to the right, windings 269 and 282 of brake clutches 271 and 284 are energized from the sources 267 and 280 and motors 273 and 278 are de-energized. Clutches 271 and 284 grasp and hold the shafts of motors 273 and 278, respectively.

The shafts of motors 273 and 278 are connected through a differential 286 whose output shaft is connected to drive the rotor of control transformer 272. The position of the output shaft of differential 286 has an angle, $\mu_0 - \alpha_0 = \mu_1$ which is a measure of the difference between the computed azimuth error $\alpha_0$ of the position of the north-pointing accelerometer and the angle $\mu_0$ measured by azimuth synchro 266. Switch 268 is moved to its down position to connect synchro 266 to the stator of transformer 272. The rotor of control transformer 272 is connected through amplifier 288 to azimuth motor 290 to servo the angle $\mu$ into $\mu_1$, with the north-pointing accelerometer pointing more precisely north.

Azimuth motor 290 may be motor 57 or motor 64. When the platform is oriented as shown in FIG. 5, motor 290 is motor 57. When the platform is oriented as shown in FIGS. 6 and 7, motor 290 is motor 64.

Figure 9:
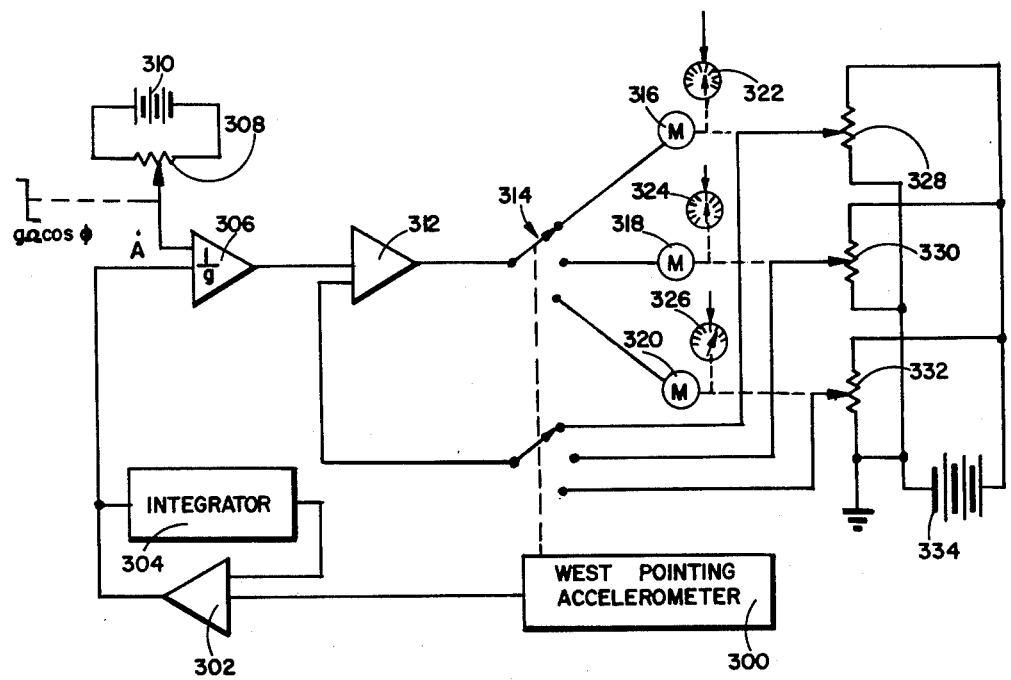
FIG. 9 is a schematic diagram of a second analog computation network used to calibrate the drift rate of the platform.
Figure 10:
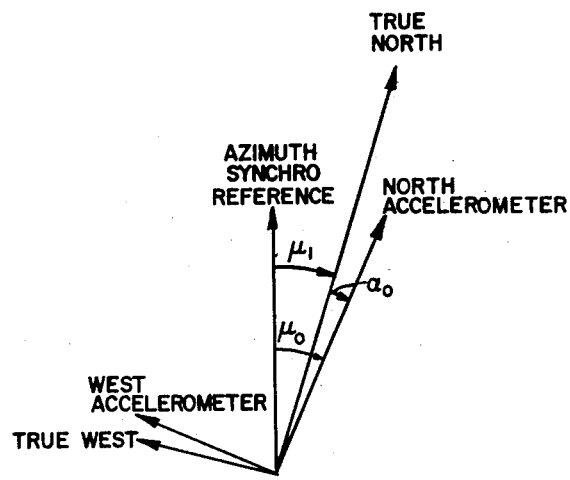
FIG. 10 is a diagram showing the angular relation between directions during calibration of the platform.

In the analog computer of FIG. 9, the west-pointing accelerometer 300 may be accelerometer 38, accelerometer 40, or accelerometer 42. When the platform is oriented as shown in FIG. 5, it is accelerometer 40, in FIG. 6 it is accelerometer 38, and in FIG. 7 it is accelerometer 42.

Accelerometer 300 is connected through a differentiating network comprising amplifier 302 and feedback integrator 304. The output of the differentiating circuit is proportional to the time rate of change of the component of the gravity force measured by accelerometer 300. For small angles, this accelerometer output signal is a measure of the tilt rate about the north-south axis of platform 20. The output of amplifier 302 is connected to the input of summing or difference amplifier 306. A second input to amplifier 306 is a voltage which is proportional to the acceleration of gravity times the local horizontal component of the earth's angular velocity. The second input is obtained by mechanically positioning potentiometer 308, connected across a source of voltage 310. The output of amplifier 306 is its input divided by the acceleration of gravity, which is a measure of the computed value of angular velocity in inertial space about the particular X, Y, or Z axis of platform 20 which is then pointing north. The output of amplifier 306 is connected to a servo amplifier 312. The output of amplifier 312 is connected through switch 314 to motor 316, motor 318, or motor 320 depending on the position of switch 314. Motors 316, 318, and 320 drive dial gauges 322, 324, and 326, respectively. Motors 316, 318, and 320 also drive the movable arms of potentiometers 328, 330, and 332, respectively. Potentiometers 328, 330, and 332 are energized by voltage source 334. The voltages appearing on the movable arms of potentiometers 328, 330, and 332 are fed back through switch 314 through the input of servo amplifier 312 to cause the shafts of motors 316, 318, and 320 to assume shaft positions which are measures of the angular velocities of platform 20 about the sensitive axis of the particular accelerometer which is then pointing in a north direction.

In operation of the platform which is shown in FIG. 1, each of the gyroscopes 50 and 52 tends to drift at a substantially constant rate due to manufacturing errors, and other factors. No external torques except that applied from amplifier 54 are allowed. As the rotor of gyroscope 50 drifts, an angle is detected about both the X and Y axes. The detection of such an angle may best be explained by referring to FIG. 3.

In FIG. 3, rotor 100 freely spins upon a film of gas at the bearing surface 102. Rotor 100 is driven by a motor 108 and, in gyroscope 50 may be driven by an additional motor winding (not shown) positioned in place of torquer winding 110. Axes 114 and 118, which are fixed relative to frame 112, are positioned upon platform 20 to coincide with axes X and Y, respectively. As rotor 100 drifts about axis 118, due to the aforementioned manufacturing errors and other factors capacity pickoff 120 and an additional capacity pickoff (not shown) positioned radially opposite pickoff 120 detect the angular position of rotor 100 about axis 118 to generate a signal which is a measure of the tilt of rotor 100 about axis 118 relative to frame 112. Similarly, tilt of rotor 100 relative to frame 112 about axis 114 is detected by a pair of capacity pickoffs 116 and an additional pickoff (not shown) positioned radially opposite pickoff 116.

The angle of tilt of the rotor of gyroscope 50 as measured by the various pickoffs on gyroscope 50 causes a signal to be delivered to resolver 58 which causes the proper signals to be delivered through amplifiers 60 and 26 to motors 64 and 66 to rotate shafts 27 and 30 in directions to return to zero the output signals of the various pickoffs on gyroscope 50.

Gyroscope 52 is similar to that shown in FIG. 3. In gyroscope 52, axis 114 is aligned with the Z axis of platform 20. Axis 118 is positioned in the X, Y, plane. The orientation of axis 118 in the X, Y plane is not important. Any tilt of rotor 100 relative to frame 112 about axis 118 in gyroscope 52 is detected and channeled through amplifier 54 to torquer 110 which places a torque on member 106 of rotor 100 in the proper sense and direction to return and maintain rotor 100 undeflected about axis 118. Platform body 20 follows drifting rotors 100 of gyros 50 and 52. Therefore, platform body 20 has imparted to it an angular velocity that is the vector sum of the drift angular velocities of the individual rotors of gyros 50 and 52.

Platform 20 can be understood to rotate about the resultant angular velocity vector. This vector defines an axis which, as long as the drift rates of gyroscopes 50 and 52 are constant, is fixed in direction both relative to inertial space, and relative to the platform.

In this invention the components in X, Y, and Z, platform-fixed coordinates of the angular velocity of rotation of platform 20, caused by the drift of gyroscopes 50 and 52, are determined. To that end, regardless of the kind of gyroscope employed on platform 20, a technique and mechanism is described and claimed herein which is adapted to obtain the angular velocity components of platform 20 in terms of X, Y, and Z coordinates.

In the mechanism of FIG. 2, platform 20 is caused to rotate due to the drift of single axis gyroscopes 80, 82, and 84 whose output axes are preferably aligned with axes X, Y, and Z. Gyroscopes 80, 82, and 84 may be single degree of freedom gyroscopes of a conventional kind with a spinning rotor. However, a vibrating string may also be used. When members 80, 82, and 84 are vibrating strings, their operation may thus be understood by referring to FIG. 4.

In FIG. 4, a vibrating string 124 is supported on either end by enlarged portions 126 and 128. A conducting membrane 134 is supported on a nodal ring 136 relative to frame 132. Membrane 134 is caused to oscillate by applying voltages between membrane 134 and electrode 142. The motion of membrane 134 is detected by capacity pickoff 140. The voltage generated on electrode 140 is amplified, the phase is adjusted by phase adjustor 152 and the resulting signal is fed back through amplitude controller 154 and amplifier 146 with the proper phase to maintain oscillation. String 124 oscillates in a plane in a magnetic field which generates a voltage between the two ends of string 124. When the string vibrates perpendicular to the field a particular voltage is induced. When the string vibrates parallel to the field a zero voltage is induced. When the string 124 vibrates at some angle relative to the field, a voltage is induced between the two ends of string 124 which is a measure of the angle which the plane of vibration of the string makes in the magnetic field. Thus the voltage between frame 132 and terminal 131 is also a measure of the rotation of case 132 relative to the plane of vibration of string 124.

If the tension in string 124 is varied, the plane of vibration of string 124 tends to drift. To eliminate or stabilize the drift, a strain measuring device 156 is used to generate a voltage at terminal 158 which is fed through amplifier 152 and compared to the output of amplifier 150 to generate a voltage which is adapted to control the amplitude of the output of amplitude controller 154 to maintain substantially constant the stress in string 124. Even if it is not desirable to cause the drift of the instrument to be zero, it is desirable to know what the drift of the instrument is and to know that the drift remains constant. To this end, the control circuit which is shown in FIG. 4 can be used.

In FIG. 2, three vibrating string devices, such as that shown in FIG. 4, are oriented with the axes of their vibrating strings parallel to the platform axes, respectively. The outputs of instruments 80 and 82 are distributed by resolver 58 to amplifiers 60 and 62 which in turn energize motors 64 and 66 to cause shaft 27 and 30 to rotate to return to zero the signals at the outputs of instruments 80 and 82. The output of instrument 84 is connected through amplifier 56 to motor 57 to cause shaft 23 to rotate to return to zero the output of instrument 84. Hence the platform 20 can be seen to follow the angularly drifting planes of vibration. Platform 20 has imparted to it an angular velocity that is the vector sum of the drift angular velocity vectors of the individual planes of vibration of vibrating string instruments 80, 82, and 84.

In the device of FIGS. 1 and 2, as shaft 27 rotates, pickoff 68 detects the rotation and causes motor 72 by means of amplifier 70 to rotate shafts 33 and 34 to cause the planes of gimbals 24 and 28 to remain substantially perpendicular to each other in order to prevent gimbal lock.

As platform 20 is rotating in response to the drift rate of the gyroscopes 50 and 52 or of the vibrating strings 80, 82, and 84, accelerometers 38, 40, and 42 generate outputs which may be used for guidance purposes. However, before the outputs of accelerometers 38, 40, and 42 may be used for guidance purposes, it is necessary to determine the direction of the axis of rotation and the angular velocity about the axis of rotation of platform 20 in terms of platform coordinates X, Y, and Z.

In the calibration of the angular velocity of drift, the technique described in connection with FIGS. 5, 6, and 7 is an example of only one sequence, out of a larger number of possible sequences, of calibration operations.

In the process described in connection with FIGS. 5, 6, and 7, the X axis is first oriented approximately north (FIG. 5) with the Y axis approximately west. An estimate is made of the drift of platform 20 about the Y axis. This estimate is an educated guess, perhaps made upon the basis of the known or estimated drift of the individual instruments 80, 82, and 84. The angular velocity of rotation of platform 20 about the Y axis is computed from the computed angular velocity. The difference is the angular velocity of platform 20 about the Y axis arising from mis-alignment $\alpha_0$ of the Y axis from a true west direction. The mis-alignment is computed, and the alignment of the X and Y axes with respect to true north and west is corrected.

After the alignment of the X axis is corrected, the angular velocity of platform 20 about the X axis is computed from the measured rate of change of the gravity component sensed by accelerometer 40. The known horizontal component of earth rotation rate is subtracted from this computed angular velocity to obtain a first approximate measure of the drift angular velocity of platform 20 about the X axis.

The platform is next oriented with the X axis west and the Z axis north (FIG. 6). The previously computed first approximate measure of the drift angular velocity of platform 20 about the X axis is used to compute a correction to align the Z and X axes more closely to true north and west, respectively.

The drift angular velocity of platform 20 about the Z axis is next computed.

The platform is next oriented with the Z axis west and the Y axis north (FIG. 7). The previously computed measure of the drift angular velocity of platform 20 about the Z axis is used to compute a correction to align the Y and Z axes are closely to true north and west, respectively.

The drift angular velocity of platform 20 about the Y axis is next computed to a predetermined high level of accuracy.

The drift angular velocity of platform 20 about the X axis is next re-computed, after alignment, to a predetermined high level of accuracy.

It is to be noted that the drift angular velocity about a north-pointing axis which is previously calculated is used in the alignment process of the same axis into a west direction for which the drift angular velocity about the next north-pointing axis is to be computed.

By successively indexing the axis, in order, from north to west, the accuracy of alignment on each succeeding step is better than previously realized. The accuracy of alignment, measurement, computation, and calibration converges to a suitably fine magnitude, by this means.

It is apparent that the convergence of accuracy of calibration could also be achieved by indexing the axes, in order, from north to east. Two other converging sequences are possible as well, i.e. from south to west and from south to east.

Preparatory to calibrating the angular velocity of platform 20, accelerometers 38 and 40 are connected as shown in FIG. 5. The gravity component sensed by accelerometers 38 and 40 causes motors 66 and 64 to rotate to return to zero the outputs of accelerometers 38 and 40. To control properly the motors 64 and 66, it is important that accelerometers 38 and 40 point in the directions shown in FIG. 5. The shafts 29 and 30 are aligned in an approximately north-south direction. That is, shafts 29 and 30 are aligned as near as practicable to a north-south direction. The mechanical input 190 of synchro differential transformer 186 is then adjusted to position, in azimuth, the sensitive axes of accelerometers 38 and 40 to cause the sensitive axis of accelerometer 38, and hence the X axis of platform 20, to point in an improved northerly direction. The sensitive axis of accelerometer 40, and hence of the Y axis of platform 20, is pointed in an improved westerly direction. The preliminary pointing accuracy in pointing the accelerometer 38 sensing axis north by use of synchro angle transducers is not sufficiently accurate to proceed with the calibration. Hence the following procedure will be necessary to improve the pointing accuracy. Typically, the preliminary pointing accurary of the X axis of platform 20 may be a degree or so away from the true north direction.

Referring to FIG. 8, potentiometer 258 is adjusted to an estimated value of $\omega_y g$, the aforementioned educated guess of the Y axis drift rate multiplied by the gravity acceleration. Switch 268 is placed in its upward position. Switches 265 and 276 are placed in the position shown. Control of the gimbals which support platform 20 is then rapidly switched to the circuit shown in FIG. 2 to cause the vibrating string instruments to control orientation of platform 20. The north-pointing accelerometer, which in FIG. 5 is accelerometer 38, is connected to the input of amplifier 252. The azimuth synchro 266 (184 in FIG. 5) is connected to the input of switch 268.

If the sensitive axis of one accelerometer (for example accelerometer 38) were pointing to the true north, and if the sensitive axis of a second accelerometer (for example accelerometer 40) were pointing in the direction of true west, any rotation of platform 20 about the Y axis would be due alone to drift of the platform.

Because the sensitive axis of accelerometer 40 is not aligned in a true western direction, the rotation of platform 20 about the Y axis has an additional component of the earth's rotation. It is proposed to differentiate the output of accelerometer 38 and to use the differentiated ouput $\dot{A}_x$ as a measure of the angular velocity relative to the earth of platform 20 about the Y axis. The time derivative of $\dot{A}_x$ is divided by $g$, the acceleration of gravity, to convert it to units of angular velocity. As long as the off-level angle of platform 20 about the X axis is small, the angular velocity of platform 20 about the Y axis is approximated by $\dot{A}_x$ divided by $g$. This latter quantity in fact is equal to the sum of the angular velocity due to the azimuth error induced component of earth rotation $\Omega\alpha_0 \cos \phi$ plus the angular velocity of the platform drift about the Y axis, designated $\omega_y$.

Stating the above equality with an appropriate preservation of sense, one obtains:

$$\omega_y - \Omega\alpha_0 \cos \phi = \frac{\dot{A}_x}{g}$$

from which one may solve for $\alpha_0$:

$$\alpha_0 = -\frac{(\dot{A}_x - g\omega_{y0})}{g\Omega \cos \phi}$$

Depending on whether the platform is oriented as shown in FIGS. 5, 6, or 7, the subscripts of $\alpha_0$, $\dot{A}_x$, and $\omega_{y0}$ will be altered to furnish proper identification.

The computer in FIG. 8 mechanizes the following equations as a function of the position of switch 255, FIG. 8 with signals from the corresponding structure of FIGS. 5, 6, and 7.

| FIG. 8 Switch 255 connected to potentiometer | Mechanization Equation |
|---|---|
| 258 | $\alpha_1 = -\frac{(\dot{A}_{x0} - g\omega_{y0})}{g\Omega \cos \phi}$ |
| 260 | $\alpha_2 = -\frac{(\dot{A}_z - g\omega_x)}{g\Omega \cos \phi}$ |
| 262 | $\alpha_3 = -\frac{(\dot{A}_y - g\omega_z)}{g\Omega \cos \phi}$ |
| 258 (repeat) | $\alpha_4 = -\frac{(\dot{A}_x - g\omega_y)}{g\Omega \cos \phi}$ | where $\alpha_1$ = computed azimuth error $\alpha_0$ of X axis in FIG. 5
$\alpha_2$ = computed azimuth error $\alpha_0$ of Z axis in FIG. 6
$\alpha_3$ = computed azimuth error $\alpha_0$ of Y axis in FIG. 7
$\alpha_4$ = computed azimuth error $\alpha_0$ of X axis in FIG. 5
$g$ = observed value of gravity at the test station
$\phi$ = geographic latitude
$\omega_{y0}$ = initial estimate of west axial angular rate about the Y axis of FIG. 5
$\omega_x$ = calibrated angular rate about the X axis of FIG. 5
$\omega_z$ = calibrated angular rate about the Z axis of FIG. 6
$\omega_y$ = calibrated angular rate about the Y axis of FIG. 7
$\Omega$ = earth angular rate
$\dot{A}_{x0}$ = north accelerometer output rate in FIG. 5
$\dot{A}_z$ = north accelerometer output rate in FIG. 6
$\dot{A}_y$ = north accelerometer output rate in FIG. 7
$\dot{A}_x$ = north accelerometer output rate in FIG. 5 repeated The computer of FIG. 8 is adapted to solve the above four equations by analog computer means to obtain a value for $\alpha_0$ (see FIG. 10) which is translated into an electrical signal adapted to control motor 290 to align the sensitive axis of the approximately north-pointing accelerometer 250 into the direction of true north.

In FIG. 8, amplifier 252 and feedback integrator 254 differentiate the signal from accelerometer 250. Summing amplifier 256 sums the differentiated acceleration signal with a signal which is a measure of the angular velocity of paltform 20 about the Y axis multiplied by the acceleration of gravity.

In the first approximation in the calibration process of this invention, the position of the movable arm of potentiometer 258, which generates a signal which is a measure of $\omega_y g$, is set to a position which is a measure of the estimated value of $\omega_y g$.

Potentiometer 257 is pre-set in accordance with the known acceleration of gravity, and the known northward component of angular velocity of the earth, $\Omega \cos \phi$, in order to divide the output signal from amplifier 256 by a factor $g\Omega \cos \phi$. The signal appearing on the movable arm of potentiometer 257 is a measure of the computed value of $\alpha_0$.

Servo amplifier 261, together with potentiometer 263, attached to the shaft of motor 273, causes the shaft position of motor 273 to be positioned at an angle which is a measure of platform azimuth angle $\alpha_0$.

Azimuth synchro 266 generates a signal which is a measure of the angle between (for example in FIG. 5) a predetermined reference on the gimbal structure and the direction of the X axis of platform 20. The signal from synchro 266 is connected through control transformer 270 which actuates a servo amplifier 274 and motor 278 to drive shaft 279 through an angle which is a measure of the angle $\mu_0$ (see FIG. 10) between the sensitive axis of the approximately north-pointing accelerometer and a reference position on the gimbals.

Differential 286 causes a shaft rotation and rotation of the rotor of synchro control transformer 272 which is proportional to $\alpha_0 - \mu_0$. Switches 265, 276, and 268 are now transferred to cause brake clutches 269 and 282 to be energized and locked and to cause synchro 266 to be connected to the stator windings of control transformer 272. Azimuth motor 290 (for example motor 57 of FIG. 5) is controlled in response to the signal at the output of amplifier 288, which is connected by its input to the rotor of control transformer 272. With switch 263 in the down position, the signal at the output of the rotor of control transformer 272 is a measure of the instantaneous angle between the true north position, calculated by the computer of FIG. 8, and the north directed accelerometer. Thus, the north directed accelerometer is servoed into alignment with the computed true north position.

After the north-pointing accelerometer has been servoed to the computed true north position, the computer of FIG. 9 is actuated. Platform 20 is allowed to drift about the north axis due both to the drift of the platform and the rotation of the earth. The rotation of platform 20 about the north-pointing axis of the platform 20 is detected by the west-pointing accelerometer. The signal generated by accelerometer 300 is differentiated by the combination of amplifier 302 and feedback integrator 304 to generate a signal, at the input of difference amplifier 306, which is proportional to the time derivative of the output of accelerometer 300. A second signal, which is proportional to $g\Omega \cos \phi$, the local north component of earth angular velocity is inserted into amplifier 306 and subtracted from the A signal. The scale factor of amplifier 306 is proportional to $$\frac{1}{g}$$

whereby the output of amplifier 306 is a measure of the controlled drift of platform 20 about the north-pointing axis (for example in FIG. 5, about the X axis).

When switch 314 is positioned in the position shown, amplifier 312 and potentiometer 328 servo the shaft position of motor 316 to be a measure of the electrical output, $\omega_x$ of amplifier 306. A mechanical device such as dial 322 is used to measure the shaft position of motor 316.

The computer in FIG. 9 mechanizes the following equations:

| FIG. 9 Switch 314 Position | Angular Rate Component Computation Mechanization |
|---|---|
| Up | $\omega_{x0} = \frac{\dot{A}_y + g\Omega \cos \phi}{g}$ |
| Center | $\omega_z = \frac{\dot{A}_x + g\Omega \cos \phi}{g}$ |
| Down | $\omega_y = \frac{\dot{A}_z + g\Omega \cos \phi}{g}$ |
| Up (repeat) | $\omega_{x1} = \frac{\dot{A}_y + g\Omega \cos \phi}{g}$ | where $\omega_x$ is the improved determination of $\omega_{x0}$, using azimuth error $\alpha_4$ instead of azimuth error $\alpha_1$.

The shaft position of the motor 316 and the position of dial 322 are used to adjust the position of potentiometer 260 of FIG. 8. The information obtained from dial 322 is more accurate than the guess which was previously used to set potentiometer 258.

The platform 20 is then oriented as shown in FIG. 6 with the Z axis pointing nominally north and the X axis pointing nominally west. Differential transformer 198 controls motor 64 for fine adjustment of orientation. The accelerometers 38 and 42 are leveled by using their outputs to control motors 66 and 57 until accelerometers 42 and 38 have no output. Platform 20 is then allowed to be controlled by the outputs of instruments 80, 82, and 84 in accordance with the description of operation of the device of FIG. 2.

The north-pointing accelerometer 250 is now accelerometer 42 and the west-pointing accelerometer 300 is now accelerometer 38. Switch 255 is switched to contact the arm of potentiometer 260. Switches 263, 265, and 276 are re-positioned into the position shown in the FIG. 8. Azimuth synchro 266 is now synchro 196 and azimuth motor 290 is now motor 64. The output of accelerometer 42 is used to calculate, at the movable arm of potentiometer 257, a new $\alpha_0$ which is a measure of the angle between the sensitive axis of accelerometer 42 and the true north. It is to be recognized that this calculation is more accurate than that achieved in the initial calculations for the setting of FIG. 5 because of the increased accuracy of knowing the position to which the arm of potentiometer 260 can be set over knowing the position for setting the arm of potentiometer 258.

The output shaft of differential 286 is a measure of $\alpha_0$ minus $\mu_0$ where $\mu_0$ is the angle measured by synchro 196. Motor 64 (290 in FIG. 8) drives gimbal 28 to cause the sensitive axis of accelerometer 42 to be pointed in the direction of the true north.

The west-pointing accelerometer 300 (accelerometer 38 in FIG. 6) is connected through the differentiating circuit of amplifier 302 and integrator 304, through difference amplifier 306 to generate a signal at the output of amplifier 306 which is a measure of $\omega_z$, the drift angular velocity of platform 20 about the Z axis. Switch 314 is positioned into its center-tap position. Servo amplifier 312, together with potentiometer 330, causes the motor 318 to drive its shaft into position which is a measure of $\omega_z$. A measure of $\omega_z$ may be read directly from dial 324.

The measurement appearing on dial 324 is used to set the position of potentiometer 262. It is to be recognized that the setting of potentiometer 262 is more accurate than the previous seting of potentiometers 258 and 260.

Platform 20 is now placed in the third orientation, as shown in FIG. 7, of the described calibration sequence of this invention. The Y axis of platform 20 is positioned in a north direction and the Z axis is positioned in a west direction. That is, the sensitive axis of accelerometer 40 is positioned in a north direction and the sensitive axis of accelerometer 42 is positioned in a west direction.

The sensitive axes of accelerometers 40 and 42 are leveled by allowing accelerometers 40 and 42 to control motors 57 and 66 until no signal appears at the accelerometer output terminals.

Instruments 80, 82, and 84 are then allowed to control platform 20, as set forth above, in the description of the operation of the device in FIG. 2.

The north-pointing accelerometer 250 of FIG. 8 is now accelerometer 40. The azimuth synchro 266 of FIG. 8 is now synchro 196. The azimuth motor 290 of FIG. 8 is now motor 64. The west-pointing accelerometer 300 of FIG. 9 is now accelerometer 42.

In FIG. 8, switch 255 is connected to the movable tap of potentiometer 262. Switches 268, 265, and 276 are returned to the position shown in FIG. 8. The output of accelerometer 42 is differentiated by amplifier 252 and integrator 254, and applied to the input of summing amplifier 256 where it combines with the signal from the movable arm of potentiometer 262. The new value $\alpha_0$ between the direction of the sensitive axis of accelerometer 42 and the true north is computed on the movable arm of potentiometer 257.

The shaft of motor 273 is servoed to have its angle be a measure of $\alpha_0$. The shaft of motor 278 is servoed to have its shaft angle be a position of the angle sensed by synchro 196. The output shaft of differential 286 has an angular measure which is a measure of the difference between $\alpha_0$ and $\mu_0$ where $\mu_0$ is the angle sensed by synchro 196. That is, the shaft angle at the output of differential 286 is the angle through which motor 64 must turn to align the Z axis with the true north. When switches 263, 265, and 276 are switched, motor 64 is servoed to align the sensitive axis of accelerometer 40 into the direction of the true north.

West-pointing accelerometer 300 (accelerometer 42 in FIG. 7) is connected through a differentiating circuit to cause the output of amplifier 306 to be a measure of $\omega_y$. Switch 314 is moved into its third position which connects the output of amplifier 312 to motor 320 and its feedback input to the movable arm of potentiometer 32. Servo amplifier 312 servos the shaft of motor 320 into an angular position which is a measure of $\omega_y$. Dial 326, connected to the shaft of motor 320, reads a measure of $\omega_y$. The accuracy of $\omega_y$ is very precise compared to the original estimate used in the first calibration of the sequence. The reading of $\omega_y$ which appears on shaft 326 may be used to re-adjust the movable arm of potentiometer 258.

The calibration step with the platform oriented as shown in FIG. 5 is then repeated using the precision-adjusted position of potentiometer 258 as the basis for calculation of $\omega_x$.

Thus the readings of dial 322, 324, and 326 are a true measure of $\omega_x$, $\omega_z$, and $\omega_y$, the controlled angular drift rates of platform 20 about their own coordinate axes.

It is apparent from this invention that an indexing sequence in which the north-pointing accelerometer in one step of the calibration process is used as the west-pointing accelerometer in the next step of the calibration process can be used to calibrate the platform drift angular velocity. It is apparent also that a process wherein the north-pointing accelerometer in one step of the process is pointing east in the next step of the process could be used. Similarly, a consecutive process from south to west or from south to east could be used. It is important that once one of the aforementioned sequences is chosen, the sequence be consistent throughout the sequence of calibration steps.

The device of this invention is particularly adapted to calibrate the controlled drift angular velocity rate of the platform 20. By carrying the calibration procedure through one more step and comparing the value found in step five with that found in step two, any material discrepancy in repetively determined drift components would indicate that the gyroscope or vibrating strings which control the platform rotation are operating erratically. Thus, the process of this invention is capable of suspecting malfunctioning gyroscopes as well.

In order to demonstrate the accuracy of estimating the three angular rate components, it is apparent that any angular rate component calibration error depends on the calibration error of the previously calibrated angular rate component as well as the azimuth correction error. The following equations state the calibration errors very nearly, and are used in the below-numbered succession in order to demonstrate the typical accuracy in calibrating the platform angular rate components, by the above mechanization equations.

(1) $$\Delta \alpha_1 = \sqrt{\frac{\Delta \omega_{y0}^2}{\Omega^2 \cos^2 \phi} + \Delta \alpha_3^2}$$

(2) $$\frac{\Delta\omega_{x0}}{\Omega \cos \phi} = \frac{\Delta\alpha_1^2}{2}$$

(3) $$\Delta\alpha_2 = \sqrt{\frac{\Delta\omega_x^2}{\Omega^2 \cos^2 \phi} + \Delta\alpha_s^2}$$

(4) $$\frac{\Delta\omega_z}{\Omega \cos \phi} = \frac{\Delta\alpha_2^2}{2}$$

(5) $$\Delta\alpha_3 = \sqrt{\frac{\Delta\omega_z^2}{\Omega^2 \cos^2 \phi} + \Delta\alpha_s^2}$$

(6) $$\frac{\Delta\omega_y}{\Omega \cos \phi} = \frac{\Delta\alpha_3^2}{2}$$

(7) $$\Delta\alpha_4 = \sqrt{\frac{\Delta\omega_z^2}{\Omega^2 \cos^2 \phi} + \Delta\alpha_s^2}$$

(8) $$\frac{\Delta\omega_x}{\Omega \cos \phi} = \frac{\Delta\alpha_4^2}{2}$$

where all terms, except the following, are as previously defined:

$\Delta\omega_{y0}$ = initial estimating error of the west axial angular rate in FIG. 5
$\Delta\omega_{x0}$ = resulting calibration error of the north axial angular rate
$\Delta\omega_z, \Delta\omega_y, \Delta\omega_x$ = resulting calibration errors of successive calibrations
$\Delta\alpha_s$ = gimbal azimuth correction error due to servo errors
$\Delta\alpha_1, \Delta\alpha_2, \Delta\alpha_3, \Delta\alpha_4$ = the total azimuth errors for each component calibration typically, if $$\frac{\Delta\omega_{y0}}{\Omega \cos \phi} = 0.1 \text{ and } \Delta\alpha_s = 4 \text{ mils}$$

(1) $\Delta\alpha_1 = 100$ mils (2) $\frac{\Delta\omega_{x0}}{\Omega \cos \phi} = 5$ parts/1000 already a decided improvement over the above estimate of $$\frac{\Delta\omega_y}{\Omega \cos \phi}$$

but not adequate.

(3) $\Delta\alpha_2 = 6.4$ mils (4) $\frac{\Delta\omega_z}{\Omega \cos \phi} = 2$ parts/million a satisfactorily small error (5) $\Delta\alpha_3 = 4$ mils (6) $\frac{\Delta\omega_y}{\Omega \cos \phi} = 8$ parts/million a satisfactorily small error (7) $\Delta\alpha_4 = 4$ mils (8) $\frac{\Delta\omega_x}{\Omega \cos \phi} = 8$ parts/million a satisfactorily small error.

Hence, for the typical example shown, the calibration process described herein will obtain an adequate estimating accuracy no worse than 2 parts per 100,000. The upper limit in estimating accuracy is determined by the accuracy in azimuth correction $\Delta\alpha_s$. The number of calibration repetitions would require an increase if the initial estimate of $\omega_{y0}$ is in error by near or more than 100% of $\Omega \cos \phi$. However, should this occur, a large internal change in gyroscope can be suspected, and calibration would not be feasible under such a circumstance.

Thus by a process of indexing the stabilized platform, the angular drift rate of the platform can be calibrated in terms of a cartesian set of platform-fixed coordinates. It is to be stressed that even if the platform were rotated by some other controlling means than the gyroscopes or vibrating strings, the calibration process of this invention could be used to obtain the angular rate and direction of rotation of platform 20.

Although the device of this invention has been particularly described above it is not intended that the invention should be limited by the description but only in accordance with the spirit and scope of the appended claims.

We claim:

1. A process for determining the components of angular velocity of drift of a platform, expressed in a cartesian set of coordinates fixed relative to said platform, said platform having accelerometer means positioned thereon with three sensitive axes aligned with said cartesian axes comprising the steps of: aligning a first one of said axes in a north-south and initially locally level with respect to gravity direction; aligning a second one of said axes in an east-west and initially locally level with respect to gravity direction; releasing said platform to allow it to drift; measuring and computing the angular velocity of said platform about its north-south oriented axis; subtracting the known component of rotation of said platform due to earth's rotation to determine the angular velocity of drift of said platform about its north-south oriented axis; re-aligning said first north-south oriented axis into an east-west and initially locally level with respect to gravity direciton; aligning one of said axes other than said first axis into a north-south initially locally level with respect to gravity direction; releasing said platform to allow it to drift; measuring and computing the angular velocity of said platform about its newly north-south oriented axis; subtracting the known component of rotation of said platform due to earth's rotation to determine the angular velocity of drift of said platform about its newly north-south oriented axis.

2. A process in accordance with claim 1 in which said measuring and computing of the angular velocity of said platform about its north-south oriented axis is achieved by differentiating with respect to time the acceleration signal generated by the said east-west oriented accelerometer.

3. A process for determining the components of angular velocity of drift of a platform, expressed in a cartesian set of coordinates fixed relative to said platform, said platform having accelerometer means positioned thereon with three sensitive axes aligned with said cartesian axes comprising the steps of: aligning a first one of said axes in an approximately north-south and initially locally level direction; aligning a second one of said axes in an approximately east-west and initially locally level direction; releasing said platform to allow it to drift; measuring and computing the angular velocity of said platform about its substantially east-west oriented axis, subtracting a predetermined known component of drift rotation of said platform about said approximately east-west oriented axis of said platform to determine the amount of said rotation due to earth's rotation; correcting the alignment of said axes in a north-south and east-west direction, respectively, in proportion to the computed component of rotation due to earth's rotation of said platform about the approximately east-west axis; re-releasing said platform to allow it to drift; measuring and computing the angular velocity of said platform about its north-south oriented axis; subtracting a known component of rotation of said platform due to earth's rotation to determine the angular velocity of drift of said platform about its north-south oriented axis.

4. A process as recited in claim 4 and further comprising: re-aligning said previously north-south oriented axis into an approximately east-west and initially locally level direction; aligning one of said axes other than said east-west oriented one into an approximately north-south and locally level direction; measuring and computing the angular velocity of said platform about its approximately north-south oriented axis; subtracting the previously calibrated drift component of rotation of said platform about its now substantially east-west axis to determine the component of rotation of said platform due to earth's rotation about said approximately east-west axis; correcting the heading of said north-south and east-west axes in response to said last named computed component; measuring and computing the angular velocity of said platform about its north-south oriented axis; subtracting the known component of rotation of said platform due to earth's rotation to determine the angular velocity of drift of said platform about its newly north-south oriented axis.

5. A process as recited in claim 4 and further comprising: a predetermined sequence of orienting of said axes from their north-south orientation into east-west orientation to determine, in sequence, the angular velocity of drift of said platform about its newly north-south oriented axis.

6. A process for determining the components of angular velocity of drift of a platform, expressed in a cartesian set of coordinates fixed relative to said platform, said platform having accelerometer means positioned thereon with three sensitive axes aligned with said cartesian axes comprising the steps of: computing the angular velocity of drift of said platform about a first said axis; orienting said first axis into a substantially east-west direction; orienting a second of said axes into a substantially north-south direction; differentiating the output of said north-south oriented accelerometer to generate a signal which is a measure of the angular velocity of said platform about its substantially east-west oriented axis; subtracting said computed angular velocity of drift about said east-west axis to generate a signal which is a measure of the component of angular velocity due to earth's rotation about said east-west axis, said last-named component being a measure of the angle of mis-alignment of said axes from north-south and east-west directions; correcting the orientation of said axes into a more precise alignment with the true north-south and east-west directions; differentiating the output of said east-west oriented accelerometer to obtain a measure of the angular velocity of said platform about its north-south oriented axis; subtracting the known component of rotation of said platform due to earth's rotation about said north-south axis to determine the angular velocity of drift of said platform about its north-south oriented axis.

7. A process in accordance with claim 6 in which the said axes of said platform are re-oriented in a predetermined sequence into a series of calibration steps; the re-orientation of said axes in consecutive steps being from a first predetermined north-south orientation in one step to a second predetermined east-west orientation in the next step of said sequence.

8. A process for determining the components of angular velocity of drift of a platform, expressed in an X, Y, Z cartesian set of coordinates fixed relative to said platform, accelerometer means positioned thereon with three sensitive axes aligned with and adapted to generate signals which are a measure of acceleration along said cartesian axes comprising the steps of: aligning said X axis into a substantially north-south and initially locally level direction; aligning said Y axis into a substantially east-west and initially locally level direction; releasing said platform to allow it to drift; differentiating the output of said X axis accelerometer to obtain a measure of the angular velocity of said platform about its substantially east-west orientation axis; subtracting a signal which is a previously calibrated measure of the drift of said platform about said substantially east-west axis to obtain a measure of the rotation of said platform about said east-west oriented axis due to earth's rotation, said earth's rotation component being a measure of misalignment of said X and Y axes from a true north-south and east-west orientation; correcting the orientation of said X and Y axes into a more precise north-south and east-west direction; differentiating the output of said Y axis accelerometer to obtain a measure of angular velocity of said platform about its X axis; subtracting the known component of rotation of said platform about said X axis due to earth's rotation to determine the angular velocity of the drift of said platform about its X axis; aligning said X axis into a substantially east-west and initially locally level direction; aligning said Z axis into a substantially north-south and initially locally level direction; releasing said platform to allow it to drift; differentiating the output of said Z axis accelerometer to obtain the angular velocity of said platform about its X axis; subtracting the previously calibrated component of drift rotation of said platform about said X axis to obtain a measure of the component of rotation of said platform about said X axis due to earth's rotation, said last-named component being a measure of misalignment of said X and Z axes from an east-west and north-south orientation, respectively; re-aligning said X and Z axes into a more precise north-south and east-west orientation in accordance with the calculation of said last-named component differentiating the output of said X axis accelerometer to obtain a measure of the angular velocity of said platform about its Z axis; subtracting the known component of rotation of said platform about its Z axis due to earth's rotation to determine the angular velocity of drift of said platform about the Z axis; aligning said Z axis into a substantially east-west direction; aligning said Y axis into a substantially north-south direction; releasing said platform to allow it to drift; differentiating the output of said Y axis accelerometer to obtain the angular velocity of said platform about its Z axis; subtracting the previously computed component of drift rotation of said platform about its Z axis to determine the rotation of said platform about said Z axis due to earth's rotation, said last-named earth's rotation component being a measure of misalignment of said Y and Z axes from a true north-south and east-west orientation; re-orienting said Y and Z axes into a more precise north-south and east-west orientation; differentiating the output of said Z axis accelerometer to obtain a measure of the angular velocity of said platform about said Y axis; subtracting the known component of rotation of said platform about its Y axis due to earth's rotation to determine the angular velocity of drift of said platform about its Y axis; aligning said X axis into a substantially north-south direction and said Y axis into a substantially east-west direction; releasing said platform to allow it to drift; differentiating said X axis accelerometer output to obtain a measure of the angular velocity of said platform about its substantially east-west oriented axis; subtracting the previously calculated component of drift rotation of said platform about its Y axis to obtain a measure of rotation of said platform about said Y axis due to earth's rotation, said earth rotation component being a measure of mis-alignment of said X and Y axes from a north-south and east-west orientation, respectively; correcting the heading of said X and Y axes into a more precise north-south and east-west direction; differentiating the output of said Y axis accelerometer to obtain a measure of the angular velocity of said platform about said X axis; subtracting the known component of rotation of said platform due to earth's rotation about said X axis to determine the angular velocity of drift of said platform about said X axis.

9. A process as recited in claim 8 in which said north-south orientation generates a positive signal at the output of said north-south oriented accelerometer when the sensitive axis of said accelerometer is pointing north and the output of said east-west oriented accelerometer generates a positive signal when the sensitive axis of said accelerometer is pointing west.

10. A process as recited in claim 8 in which said north-south orientation means that the then north-south oriented accelerometer has a positive output when said north-south oriented accelerometer dips toward the north and said east-west oriented accelerometer has an alignment which generates a positive output when said east-west accelerometer dips toward the east.

11. In combination with a rotatable platform whose rotation is controlled in response to the drift of angular reference means positioned upon said platform and having accelerometer means positioned upon said platform to measure acceleration in the directions of three cartesian axes fixed on said platform, means for correcting the orientation of said platform to align one of said axes into a north-south locally level direction comprising: motive means connected to said platform and adapted to control the direction of orientation of a pair of substantially north-south and a substantially east-west locally level axes of said cartesian system; differentiating means connected to the output of said substantially north-pointing accelerometer; means for generating a signal which is a measure of the angular velocity of drift of said platform about its substantially east-west direction; means for subtracting from said differentiated accelerometer output a factor which is proportional to said angular velocity of drift; means for dividing by the local horizontal component of angular velocity of the earth to generate a signal which is a measure of mis-alignment of said north-south and said east-west pointing accelerometers from a true north-south and east-west direction; and servo means connected between said last-named means and said motor means to correct the alignment of said accelerometer means.

12. In combination with a rotatable platform adapted to be rotated in response to the drift of angular inertial reference devices and having means positioned upon said platform to measure acceleration in the direction of a cartesian set of axes positioned upon said platform, means for determining the angular drift of said platform about a first one of said axes comprising: means for orienting a first one of said axes into a north-south and locally level orientation; means for orienting a second of said axes into an east-west and locally level orientation; means connected to differentiate the output of the particular said accelerometer which is pointing in an east-west direction; means for subtracting the local horizontal component of angular velocity of earth's rotation from said differentiated signal to obtain a measure of the angular velocity of drift of said platform about its then north-pointing accelerometer.

13. A device as recited in claim 12 and further comprising: a shaft, and servo means adapted to position said shaft into a position which corresponds to the magnitude of said angular velocity of drift.

14. A device as recited in claim 13 and further comprising: means for simultaneously displaying a measure of the angular velocity of drift of said platform about each axis of said cartesian axes.

References Cited in the file of this patent
UNITED STATES PATENTS

| | | |
|---|---|---|
| 2,936,627 | Wing | May 17, 1960 |
| 2,955,474 | Sutherland | Oct. 11, 1960 |

UNITED STATES PATENT OFFICE
CERTIFICATE OF CORRECTION

Patent No. 3,127,774              April 7, 1964

John J. Fischer et al.

It is hereby certified that error appears in the above numbered patent requiring correction and that the said Letters Patent should read as corrected below.

Column 5, line 35, for "transformerd" read -- transformer --; column 11, line 62, for "paltform" read -- platform --; column 14, line 58, for "repetively" read -- repetitively --; column 15, equation (7), for "z" read -- y --; column 16, line 69, for the claim reference numeral "4" read -- 3 --.

Signed and sealed this 16th day of March 1965.

(SEAL)
Attest:

ERNEST W. SWIDER
Attesting Officer

EDWARD J. BRENNER
Commissioner of Patents